May 3, 1927.
H. C. FORD
ELECTRICAL TRANSMITTER
Filed July 3, 1918      3 Sheets-Sheet 1
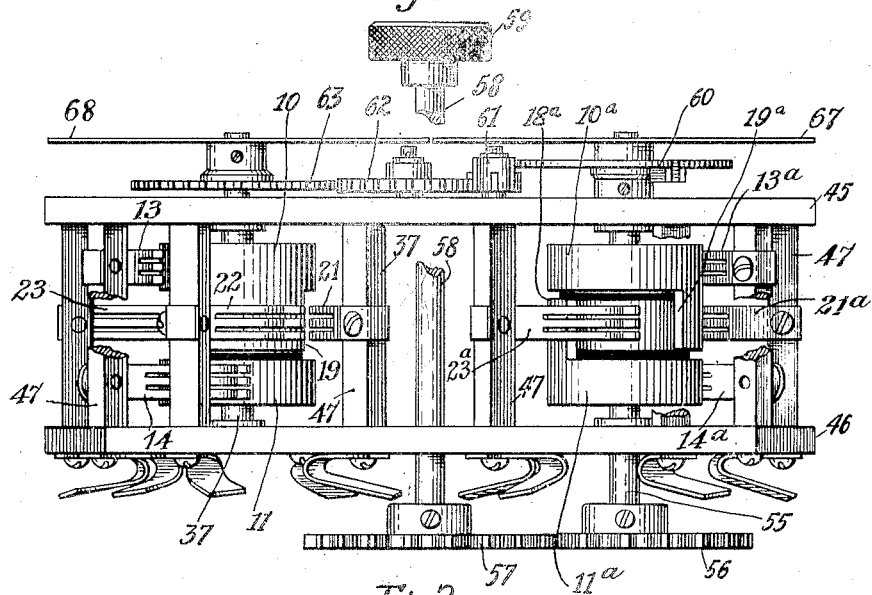
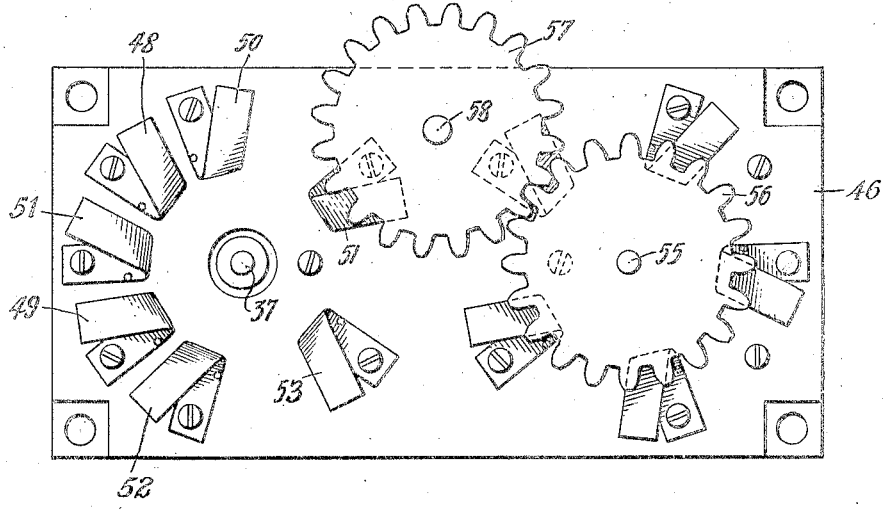

May 3, 1927.

H. C. FORD

ELECTRICAL TRANSMITTER

Filed July 3, 1918

INVENTOR
Hannibal C. Ford.
BY
ATTORNEY

May 3, 1927.
H. C. FORD
1,627,168
ELECTRICAL TRANSMITTER
Filed July 3, 1918
3 Sheets-Sheet 3
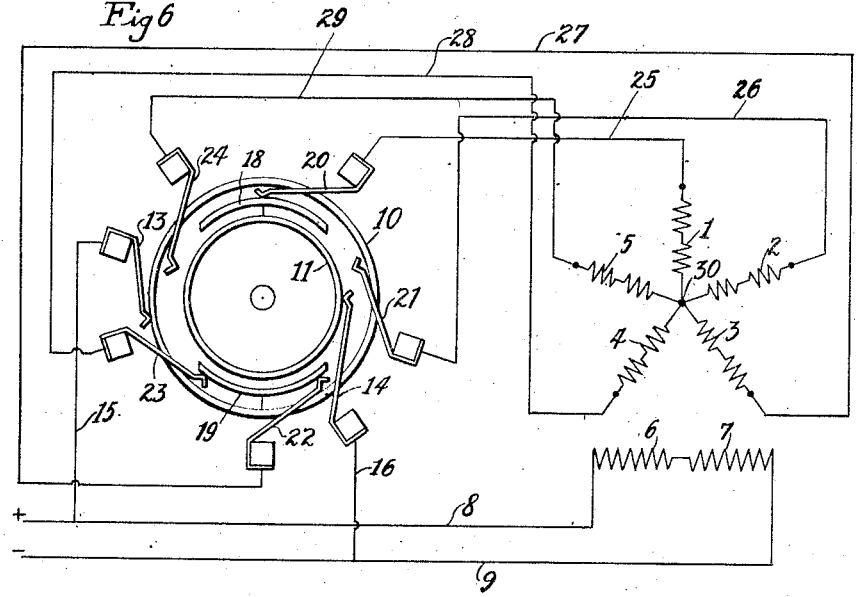
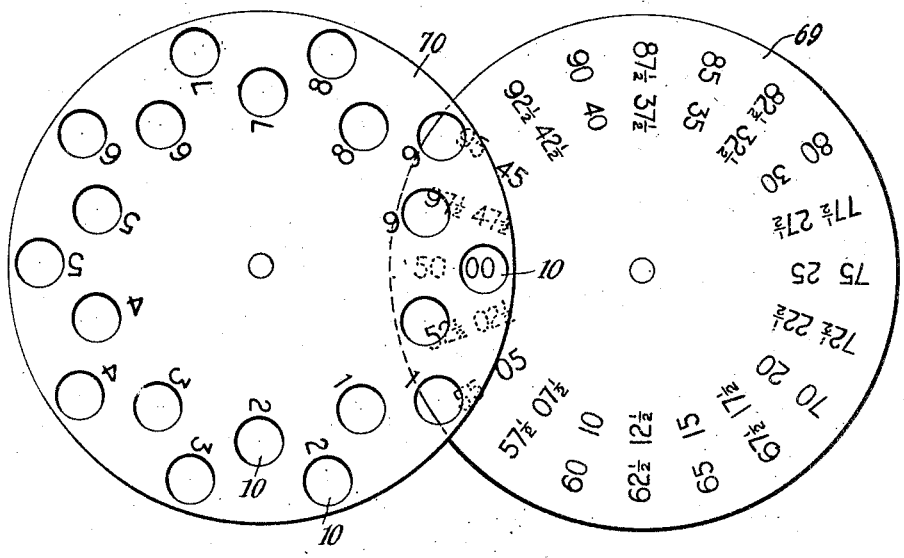
INVENTOR
Hannibal C. Ford
BY
Henry Mosley
ATTORNEY Patented May 3, 1927.

1,627,168

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

ELECTRICAL TRANSMITTER.

Application filed July 3, 1918. Serial No. 243,147.

This invention relates to electrical transmitters and more particularly to transmitters adapted to be used with step-by-step transmission signal systems.

One object of the invention is to provide a transmitter of a simple construction which is so designed that for successive positions of the transmitter a different number of poles of the step-by-step receiver motor to which it is connected, are energized.

Another object of the invention is to provide a transmitter which will permit the coils of a step-by-step receiver motor to be energized successively and remain energized for three or more successive steps of the transmitter.

Other objects of the invention will be apparent from the detailed description hereinafter to follow when taken in conjunction with the accompanying drawings and will be particularly pointed out in the appended claims.

In the drawings:—

Fig. 1 is a side elevation of one embodiment of a transmitter;

Fig. 2 is a bottom plan view thereof;

Fig. 6 is a diagram of a receiver motor and transmitter and

Fig. 7 is a modification showing the novel arrangement of dials for providing a large number of different indications.

Figure 5:
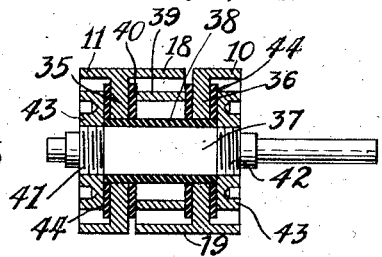
Fig. 5 is a longitudinal section through one of the rotary switches.

The transmitter shown comprises two rotary switches which are of the same construction and which are connected by mutilated gearing to cause a partial rotation of one of the switches through 1/20th revolution, for a full revolution of the other switch as will be afterward described. The transmitter has a particular adaptation to a type of receiver motor shown in my co-pending application for a signal system filed Oct. 10th, 1917, Serial No. 195,692, Patent No. 1,420,030 issued June 20, 1922, in which application a receiver motor is described which is shown diagrammatically in Fig. 6 of the present drawing.

This receiver motor consists of a plurality of coils which energize the poles of the motor, five coils being shown in the diagram and designated 1, 2, 3, 4 and 5. These coils are star connected and co-operate with a polarized armature which is shown diagrammatically as comprising coils 6 and 7. These coils are connected by main line wires 8 and 9 to a suitable source of electrical energy (not shown). The coils of the motor are connected to a rotary switch which is provided with two slip rings 10 and 11; the slip rings are connected to brushes 13 and 14 and wires 15 and 16 to the line wires 8 and 9. The two slip rings are therefore permanently energized with current of opposite polarity while the transmitter is in operation. Connected to the slip ring 11 is a contact segment 18, and similarly connected to the slip ring 10 is a contact segment 19. These two contact segments are disposed diametrically opposite each other as shown in Fig. 6. Surrounding the contact segments 18 and 19 are a plurality of brushes equal in number to the number of field coils in the receiver motor, as for example, in the present construction, five brushes are shown which are designated 20, 21, 22, 23 and 24. Each of these brushes is individually connected to one of the coils of the receiver motor, the brush 20 being connected to the coil 1 by wire 25; the brush 21 to coil 2 by wire 26; the brush 22 to coil 3 by wire 27; the brush 23 to coil 4 by wire 28 and the brush 24 to coil 5 by wire 29. The contact segments 18 and 19 are designed in the particular embodiment of the invention shown, so that the length of each contact segment is slightly greater than the distance between the ends of two of the brushes which are spaced equal distances around the contact segments, as for example: the brushes 22 and 23 are disposed so that in the position of the transmitter shown, the contact segment 19 is in contact with both of the brushes 22 and 23.

The transmitter shown in Fig. 6 has 20 different positions or four different positions for each pole of the receiver motor and assuming that the rotary switch and contact segments are in the position shown in Fig. 6. it will be seen that the current through the receiver motor passes from the plus wire 8 to wire 15, to brush 13 and contact 10, to contact segment 19 where the circuit divides, one half of the current passing by brush 22 and the wire 27 through the coil 3 and the other half passing by brush 23 and the wire 28 through coil 4 where the circuit again unites at the point 30 and passes to the negative wire 9 through coil 1, wire 25, brush 20, contact segment 18, slip ring 11, brush 14 and wire 16 to negative wire 9. It will therefore be seen that in the position of the transmitter shown three coils, namely coils 3, 4 and 1, are energized. If the transmitter is then moved through one-twentieth of a revolution the contact segment 19 will be moved out of contact with the brush 22 cutting out coil 3 and the circuit will be completed as before described, through the coils 4 and 1. Upon the second twentieth of a revolution of the transmitter, the rotary contact 18 will come in contact with the brush 21, the contact segment 19 remaining in contact with the brush 23. The circuit through the receiver motor, will then be closed from the plus side of the line through coil 4, the circuit dividing at the point 30 and passing in parallel through coils 1 and 2, to brushes 20 and 21 respectively. Upon the third twentieth of a revolution the contact segment 18 will move out of engagement with the brush 20 and the circuit will be closed through coils 4 and 2. Upon the fourth twentieth of a revolution the contact segment 19 comes into contact with brush 24, contact segment 18 remaining in contact with brush 21. The circuit is therefore closed in parallel through coils 4 and 5 to the point 30 and then through coil 2 to the negative side of the line. This completes four steps of the transmitter during which the contact 19 has remained in contact with brush 23.

For the next four steps of the switch the contact segment 19 remains in contact with the brush 24 and the circuit to two of the coils and then to three of the coils of the receiver motor are alternately closed in the same manner. It will therefore be seen that the transmitter shown in Fig. 6 is in all respects equivalent to the transmitter shown in my co-pending application Serial No. 195,692 Patent No. 1,420,030 issued June 20, 1922, referred to, in which twenty different combinations of coils are obtained and which will permit the receiver motor to be self-synchronizing and yet have four steps for each pole of the motor.

If a receiver motor having a greater number of poles is desired, the same transmitter slightly modified can be used as for example: with a nine pole motor nine brushes instead of five would surround the two contact segments 18 and 19 and the circuits to five and then four poles of the receiver motor would be alternately and successively closed.

Referring now to the mechanical construction of the transmitter which is disclosed in Figs. 1 to 5 inclusive, the rotary contacts disclosed diagrammatically in Fig. 6 are here shown in the manner in which they have been constructed in practice. The slip ring 11 and the contact segment 18 consist of a single piece of metal supported upon a circular rib 35 and having a cylindrical portion constituting the slip ring 11 and a segmental portion constituting the contact segment 18. The slip ring 10 and the contact segment 19 are of the same construction and are supported by a rib 36. These ribs are provided with square openings and are supported upon a shaft 37 from which they are separated by strips of insulation 38, like similar strips applied to shaft 55. (See Fig. 4). The contacts are held in spaced relation by a spacer 39 which is insulated from the ribs 35 and 36 by washers 40. The shaft 37 is rounded adjacent to the ends of the square body part, which rounded portions are threaded as at 41 and 42 and carry collars 43 which press against the ribs 35 and 36 to force them against the spacer 39, the collars 43 being insulated from the ribs 35 and 36 by washers 44. The shaft 37 is supported by two plates 45 and 46 of fiber or other insulating material which are maintained in spaced relation by posts 47. These posts are of conducting material and carry the brushes 13 and 14, etc. The posts which carry the brushes 13 and 14 are also electrically connected to spring clips 48 and 49 which are adapted to be connected to any suitable source of electrical energy. The other posts which carry the brushes 20, 21, etc. are also connected to spring terminals which have been designated 50, 51, 52, etc. and are adapted to be connected with terminals (not shown), which terminals are connected to the wires passing to the respective coils of the receiver motor.

In the construction shown in Fig. 1 a pair of connected rotary switches is shown, the second switch being of the same construction as the switch described and consisting of a slip ring 10ª which carries a rotary contact 19ª and a slip ring 11ª which carries a contact segment 18ª, similar to the contact segments 18 and 19 of the other control switch. These slip rings and contact segments are mounted upon a shaft 55 which extends through the plate 46 and carries a gear 56 meshing with a gear 57 upon a shaft 58 which carries an actuating knob 59 by which the rotary contacts 10 and 11 may be rotated. The shaft 55 also carries a mutilated gear 60 meshing with a mutilated pinion 61 and an idler gear 62 which meshes with a gear 63 upon the shaft 37, this train of gears forming a transfer mechanism of a well known type and so designed that for a complete revolution of the shaft 55 the shaft 37 is turned through one-twentieth of a revolution. This rotary switch is also surrounded by brushes designated 13ª, 14ª, 20ª, 21ª, etc., the number and arrangement of the brushes being the same as for the contact segments 18 and 19.

The brushes 13 and 13ª are connected by a wire 65 and the brushes 14 and 14ª by a wire 66 so that the slip rings 10ª and 11ª are also permanently energized with current of opposite polarity when the system is in operation. In practice the brushes 20ª etc. would be connected to a second receiver motor of the construction shown diagrammatically in Fig. 6 and in my co-pending application, Serial No. 195,692, Patent No. 1,420,030 issued June 20, 1922, where the system shown is capable of transmitting four hundred different readings corresponding to the four hundred steps of the transmitter shown.

Figure 3:
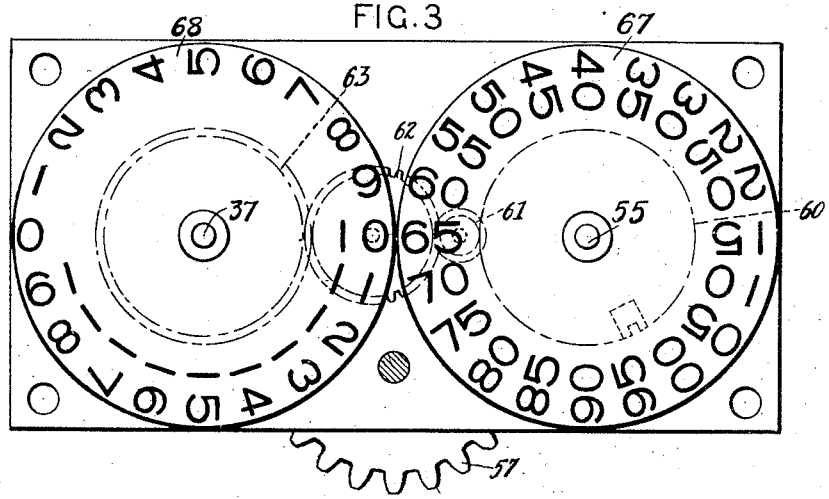
Fig. 3 is a top plan view thereof with the actuating knob removed.
Figure 4:
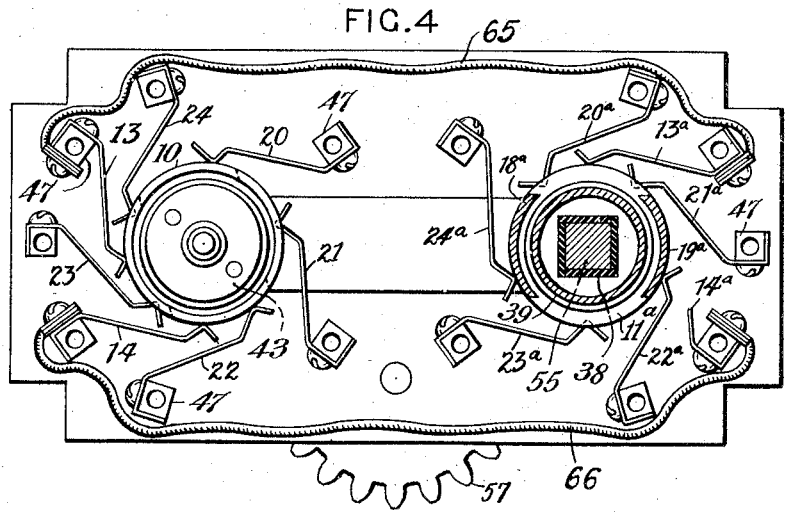
Fig. 4 is a view of the transmitter with the top supporting plate removed and one of the rotary switches shown in section.

In Fig. 3 of the drawing, two dials 67 and 68 are shown, each of which dials is provided with twenty graduations, the graduations on the dial 67 being from 0 to 95 and upon the dial 68 from 0 to 19. In this manner readings at intervals of five may be obtained from 0 to 1995 corresponding to the four hundred steps of the transmitter. Any other approved form of indications may be utilized depending upon the use to which the transmitter and signal system are to be put.

In Fig. 7 a different type of indicating dials is shown. Here the dials are designated 69 and 70. The dial 69 is provided with two circular rows of graduations, the inside row starting at 00 and ending with 47½ and the outside row starting with 50 and ending with 97½. The dial 70 is arranged in overlapping relation to the dial 69 and is provided with two circular rows of holes or openings, there being 10 holes in each row with the holes of the two rows arranged in staggered relation. Adjacent to the holes of each row are the numerals 1 to 9, one hole of each row being unmarked or marked with a 0 if desired. In this form of indicating dials, assuming that the parts are in the position shown in Fig. 7, for the first rotation of the dial 69 the numerals 2½, 5 and 7½ will successively appear behind the opening in the dial 70, the dial rotating clockwise in a step-by-step manner until the numeral 47½ appears behind the opening. Upon the next step of the dial 69 the transfer mechanism between the dials 69 and 70, which is similar to that disclosed in Fig. 1, will cause a partial rotation of the dial 70 so that the first hole of the inside row of holes will be brought into the line joining the centers of the two dials and simultaneously therewith, the dial 69 will complete its full rotation so that the numeral 50 will then appear behind the hole or opening. The successive steps of the dial 69 will then cause the numerals 52½, 55, 57½ etc. to appear behind this second opening until upon the completion of a second rotation the outside hole having the numeral 1 adjacent thereto will be brought into line and at the same time the dial 69 will be moved so that the indication 00 appears behind this last named hole or opening giving a combined reading of 100.

The further step-by-step movement of the dials will be obvious and it is evident that readings from 0 to 997½ will be obtained in steps of 2½ which is the equivalent of readings from 0 to 1995 in steps of five. The purpose of the arrangement of dials shown in Fig. 7 is to permit intermediate readings to be obtained such as are necessary in reading minutes of arc in signal transmissions upon battle ships and similar places.

I claim:

1. In an electrical step-by-step transmission, a receiver motor having at least five field coils, said field coils being star connected, an electrical step-by-step transmitter comprising a pair of insulated rotary contact segments, means for connecting said segments to a source of electrical current, a brush connected to each of said field coils, said segments being of a length and said brushes being arranged so that at least one brush is in engagement with each contact segment in each position of the transmitter and two brushes in alternate positions, whereby the circuits through two and then three of the field coils, are closed in successive positions of the transmitter.

2. In an electrical step-by-step transmission system a receiver motor having a plurality of field coils, a transmitter comprising a frame formed of spaced plates of insulation and current-conducting posts connecting said plates, a pair of insulated rotary contacts each composed of a slip ring and a contact segment, means for connecting the slip rings to a source of energy, and a plurality of brushes affixed to said posts and adapted to engage the segments, said segments and brushes being so arranged that different numbers of field coils will be energized in successive positions of the transmitter, the number of coils being in each case less than the total number of coils.

3. In an electrical step-by-step transmission system, a receiver motor having a plurality of field coils, a transmitter comprising a frame formed of plates of insulation and current-conducting posts combined therewith, a pair of insulated rotary contacts each composed of a slip ring and a contact segment, means for connecting the slip rings to a source of energy, and a plurality of brushes affixed to said posts and adapted to engage the segments, said segments and brushes being so arranged that a number of field coils less in number than the total number of coils are energized in certain positions of the segments, and a number of field coils less than the first named number are energized in succeeding positions of the segments.

4. In an electrical step-by-step transmission system, a receiver motor having at least five field coils, a transmitter comprising a rigid frame formed of plates of insulation and current-conducting members, a pair of insulated rotary contacts each composed of a slip ring and a contact segment, means for connecting the slip rings to a source of energy, and a fixed brush for each coil connected to one of said current-conducting members and adapted to cooperate with the segments, said segments and brushes being so arranged that in certain positions of the segments at least three of the field coils of the receiver will be energized while in succeeding positions of the segments a number of coils one less than the preceding number will be energized.

5. In an electrical step-by-step transmission system, a receiver motor having a plurality of field coils, a transmitter comprising a pair of insulated rotary contacts each composed of a slip ring and a contact segment, a pair of fixed brushes engaging the slip rings and adapted to be connected to a source of energy, and a plurality of fixed brushes adapted to engage the segments, said segments being of such a length and the brushes engaging the same being so disposed as to cause a different number of brushes to come into contact with the segments for successive positions of the transmitter, the number of brushes in contact with the segments being in each case less than the total number of field coils of the receiver motor.

6. In an electrical step-by-step transmitter, spaced plates of insulation, current-conducting posts connecting said plates, contact drums each surrounded by a group of said posts, a plurality of brushes mounted on the posts of each group for engagement with the contact drum associated with that group, co-acting indicating dials individually associated and operable with the different contact drums, and means to position said drums with respect to said brushes corresponding to a value indicated by the co-acting dials.

7. In an electrical step-by-step transmitter, a pair of spaced plates of insulation, current-conducting posts connecting said plates, shafts journalled in said plates, contact drums mounted on said shafts and each surrounded by a group of said posts, brushes for engagement with each drum carried by the posts surrounding it, indicating dials mounted on said shafts, and means for setting said dials to given values and said drums correspondingly with respect to their affiliated brushes.

8. In an electrical step-by-step transmitter, a shaft having a non-circular portion, a contact drum mounted thereon, brushes for engagement with said drum, and means for setting said drum in desired relation to said brushes, said contact drum comprising metallic members insulated from each other and each having a cylindrical portion and a contact segment extending toward the cylindrical portion of the other metallic member, said metallic members, having circular central portions apertured to receive and to be driven by the non-circular portion of said shaft.

9. In an electrical step-by-step transmitter, a shaft having non-circular and threaded portions, a contact drum comprising a pair of metallic members each having a cylindrical portion and a contact segment projecting therefrom, said metallic members having a central portion apertured to receive and to be driven by the non-circular portion of said shaft, a spacing member between said metallic members, threaded means for clamping the parts together, and means for insulating said metallic members.

10. In an electrical step-by-step transmitter, spaced plates of insulation, current-conducting posts connecting said plates, a contact drum surrounded by said posts, a plurality of brushes mounted on said posts for predetermined engagements with said contact drum, a dial connected to said drum to move therewith and provided with indications corresponding to the predetermined contact-making positions of said brushes and contact drum, and current-conducting spring terminals projecting from one of said plates and connected to said posts.

11. In an electrical step-by-step transmitter, spaced plates of insulation, current-conducting posts connecting said plates, contact drums journalled in said plates, dials movable with said contact drums, groups of brushes mounted on said posts each group being arranged with respect to one of said contact drums, and means for operating said drums one from the other at a predetermined ratio.

12. In an electrical step-by-step transmitter, a shaft having a non-circular portion, a contact drum mounted thereon, brushes for engagement with said drum, means for setting said drum in desired relation to said brushes, said contact drum comprising a metallic member having cylindrical and segmental contact portions and also having a web passed through and adapted to be driven by said shaft, means retaining said contact drum in position on said shaft, and insulation electrically separating said metallic member from said shaft and means.

13. In an electrical step-by-step transmitter, a shaft having non-circular and threaded portions, a contact drum mounted on the non-circular portion of said shaft, brushes for engagement with said drum, means for setting said drum in desired relation to said brushes, said contact drum comprising a metallic member having cylindrical and segmental contact portions and also having a web perforated for the passage of and conformed to the non-circular portion of said shaft, threaded means on said shaft retaining the contact drum in fixed position thereon, and insulation electrically separating said metallic member from said shaft and threaded means.

HANNIBAL C. FORD.